United States Patent [19]

McGoldrick

[11] 3,992,941

[45] Nov. 23, 1976

[54] LIQUID LEVEL MEASURING APPARATUS

[76] Inventor: Daniel J. McGoldrick, 28 Garrison Road, Hingham, Mass. 02043

[22] Filed: June 10, 1974

[21] Appl. No.: 477,801

[52] U.S. Cl. .................................. 73/313; 73/319; 73/DIG. 5; 340/244 A
[51] Int. Cl.² ................... G01F 23/06; G01B 21/00
[58] Field of Search ............ 73/305, 307, 308, 313, 73/319, 451, 453, DIG. 5, 290 R; 340/244 A, 410

[56] References Cited

UNITED STATES PATENTS

| | | | |
|---|---|---|---|
| 1,617,287 | 2/1927 | Huggins | 73/DIG. 5 X |
| 2,182,469 | 12/1939 | Davis | 73/DIG. 5 X |
| 2,771,774 | 11/1956 | Fornasieri | 73/313 X |
| 3,114,478 | 12/1963 | Hilkemeier et al. | 73/308 X |
| 3,707,940 | 1/1973 | Sherrick et al. | 340/244 A X |
| 3,710,613 | 1/1973 | Innes et al. | 73/DIG. 5 X |
| 3,815,416 | 6/1974 | Portis | 340/244 A X |

*Primary Examiner*—Richard C. Queisser
*Assistant Examiner*—John S. Appleman
*Attorney, Agent, or Firm*—Robert T. Dunn

[57] ABSTRACT

The level of liquid in a tank or a boiler is determined initially by enclosing the liquid in a column and then sensing the liquid surface in the column by causing a plunger to pass through the non-liquid medium in the column above the liquid to the liquid surface and noting the abrupt change in descent rate of the plunger when it hits the liquid surface due to the great difference between the viscosities of the non-liquid and liquid mediums. The level of liquid in the boiler is reflected on a continuing basis by permitting the plunger to float or levitate in or on the liquid as it is supported by an entrapped gas bubble. The difference in the position of the plunger when it encounters the liquid surface and the position of the plunger thereafter, as it is supported on the liquid is the correction factor that is maintained steadily until pressure or temperature changes necessitate a new determination of that difference with a fresh gas bubble at the current temperature and pressure. In a steam boiler, the plunger is hollow, vented at the bottom and rides in a vertical open cylinder. When the plunger is empty of water, it can "levitate" in the cylinder with the bottom of the plunger at the water level and so, the plunger level indicates water level in the boiler. A magnetic coupled plunger lifting mechanism completely external of the boiler couples magnetically to the plunger for doing the following: lifting the plunger; following the plunger position; and controlling the degree of levitation. By the magnetic coupling, magnetic forces pass between the plunger to an exterior rod and the rod initiates a display of plunger position.

22 Claims, 14 Drawing Figures

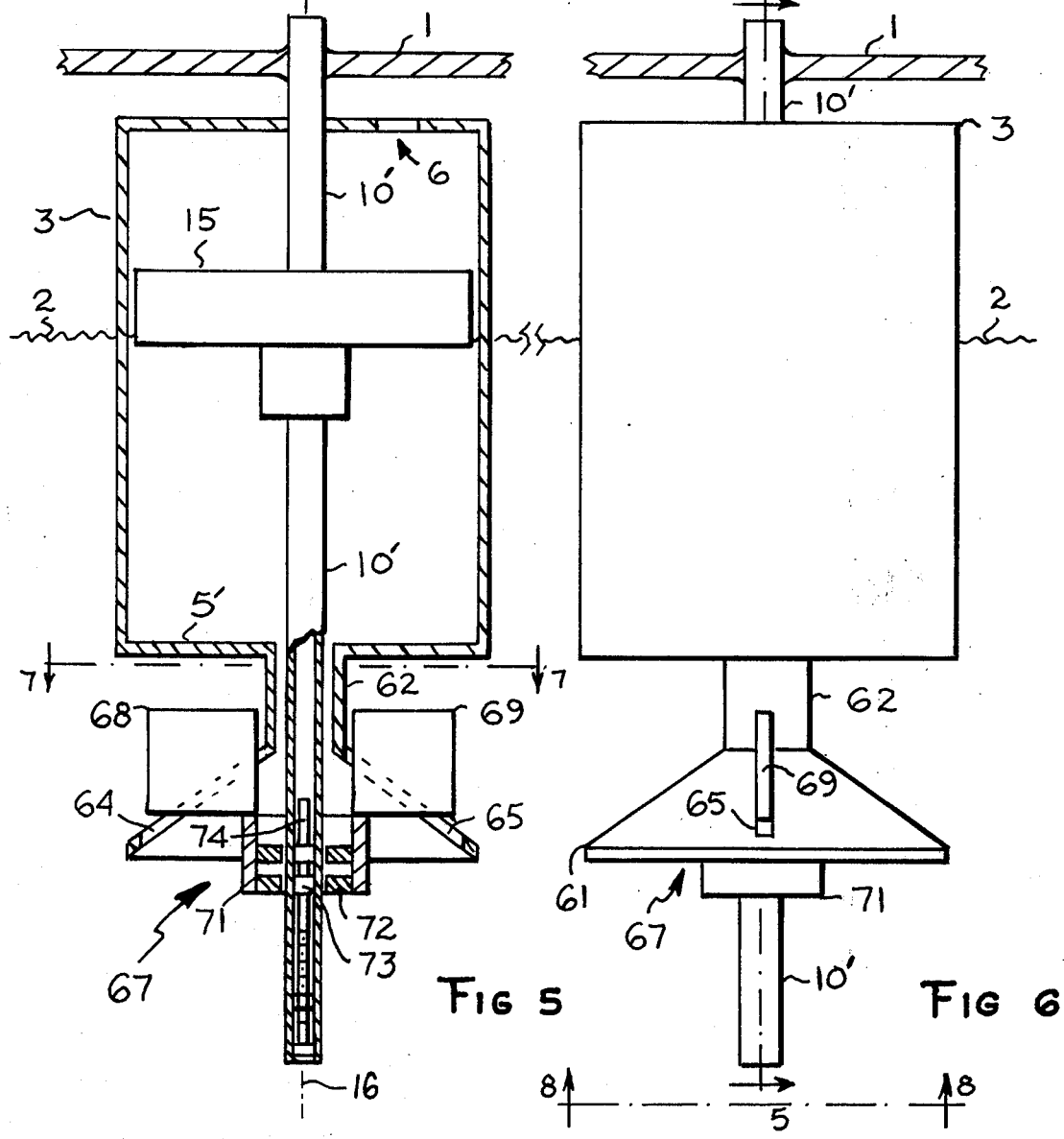

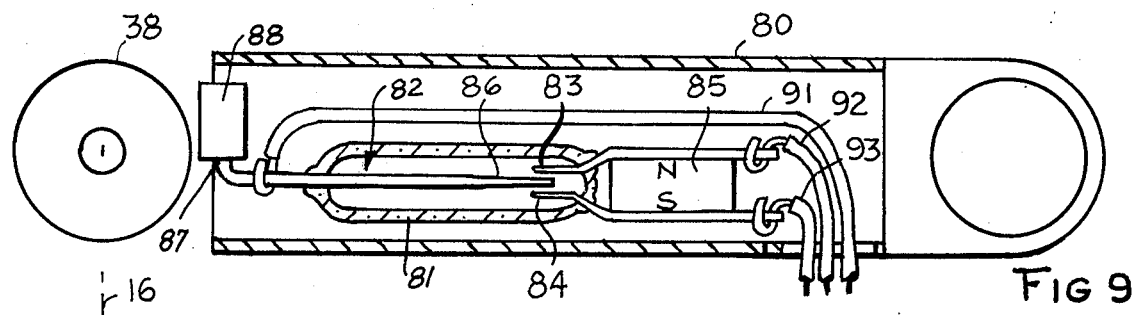
FIG 9
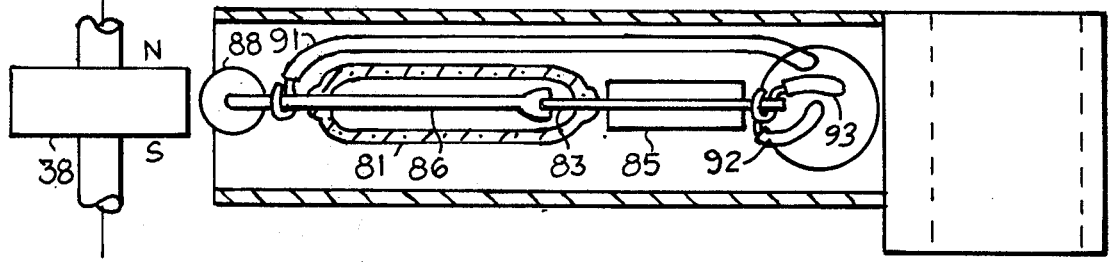
FIG 10
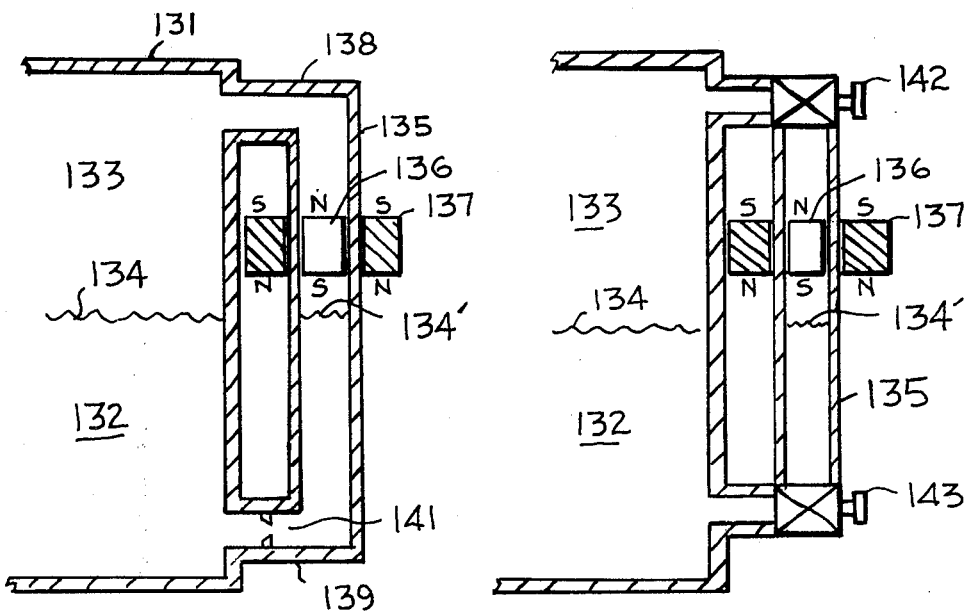
FIG 13
FIG 14

LIQUID LEVEL MEASURING APPARATUS

BACKGROUND OF THE INVENTION

This invention relates to liquid level measuring apparatus and more particularly, to apparatus for indicating the level of liquid in a high pressure boiler even while there is the continual conversion within the boiler of liquid to vapor as in a steam boiler.

In a boiler, high pressure and temperature and the presence of a condensate make accurate liquid level indication difficult. Steam boiler codes require the use of sight glass gauges, but the difference in the specific gravity of the water in the gauge and water in the boiler causes a significant variance in the level in the gauge and the level in the boiler. Very high pressures preclude the use of sight glass gauges.

Temperature-compensated Differential Pressure gauges are the primary device for automatic level indication. Gauges using a float are dependent on a buoyancy to weight relationship that at some point becomes adverse as specific gravity decreases and weight increases. Floats vented at the top for equilibrium sink when condensate collects in the float.

A variety of low pressure gauges have been designed using a float that either carries a magnet or is magnetic, to establish the location of the liquid level.

These devices use a technique of sensing whereby the float activates something like a switch or the float flips a magnetically responsive leaf. Some automatic devices use a nearby neon tube or set of magnetically responsive parallel wires positioned close to the line of travel of a magnet attached to the float. Some gauges use an exterior magnet or a magnetically responsive object positioned outside of the tank that follows the travel of a magnet attached to the float inside the tank. One such gauge uses a rolling follower while another uses a sphere in a column of liquid as a follower. Some gauges use multiple floats with a nearby reed switch and others use sequential switches on the exterior of the tank.

Each of these prior gauges has design limitations that make it inaccurate or non-functioning under conditions such as high temperatures and pressure.

Where floats have been used and the position of the float is transmitted outside the tank by a mechanical actuation (whether this is through magnetic coupling or otherwise), mechanically actuated gauges are often used to indicate the position of the float. As a rule, these gauges cannot be remotely located, but must be located on or close to the tank. In some cases, it is preferred to monitor a fluid level in the tank from a remote location and to present at the remote location a linear representation of liquid level in the tank which is capable of presenting an overall or coarse reading and a fine reading so that even very small fluctuations in the liquid can be monitored.

The prior techniques and devices described hereinabove represent but a few of the great many that have been proposed, tried and used in the past. These particular prior techniques are described herein, because the various novel features of the present invention avoid particular disadvantages of those prior techniques. Hence, those prior techniques are described in an effort to point out some of the advantages of certain features of the present invention.

SUMMARY OF THE INVENTION

It is an object of the present invention to provide a method and means of determining the surface of a fluid in a tank with apparatus which in effect touches the fluid surface and so senses the position of the fluid surface.

It is another object that the method and means so provided sense the liquid level inside the tank and transmit the sensed level to an indicator outside of the tank without mechanical, pneumatic or other physical connections through the tank wall.

It is another object to provide such method and means wherein parts inside of the tank can be manipulated from outside of the tank without any mechanical, pneumatic or other physical connections through the tank wall.

It is another object of the present invention to provide a method and means for judging the rate of generation of vapor in a steam boiler and so provide a measure of one or more parameters respresenting the efficiency of the boiler.

It is another object to provide apparatus for determining the level of liquid in a tank using a buoyed plunger inside the tank wherein at least some of the above enumerated disadvantages of prior systems are substantially avoided.

It is a further object to provide such apparatus including a plunger inside of the tank wherein the plunger can be manipulated from outside of the tank without requiring mechanical, pneumatic or other physical connections through a wall of the tank.

It is another object to provide apparatus for indicating the level of liquid inside a tank using a buoyed plunger inside the tank where the level of the plunger is transmitted to a mechanical actuation outside of the tank without requiring any mechanical, pneumatic or other physical connections through a wall of the tank.

It is another object to provide apparatus for measuring the liquid level in a tank including a magnetically coupled plunger inside the tank wherein the plunger can be mechanically manipulated from outside of the tank to release the plunger in case it jams in position.

It is another object to provide apparatus for measuring the level of liquid in a tank including a plunger that is a hollow vented float inside the tank, so designed that the plunger is unlikely to accumulate sufficient condensate to sink.

It is a further object in conjunction with the foregoing to provide means for controlling the amount of entrapped gas contained in the plunger.

It is another object in conjunction with the foregoing that such means be controllable from outside of the tank and function in conjunction with the apparatus to reveal the rate of generation of the vapor inside of the tank.

It is another object of the present invention to provide a method and means for remotely indicating the linear position of one body with respect to another.

It is a further object to provide an arrangement of magnetic switches on one body and a magnet on the other body such that a visual display energized by said switches presents a precise indication of the position of one body with respect to the other.

It is a further object in conjunction with the foregoing that the arrangement of said switches be such that even slight changes in position of one body with respect to the other which are less than would ordinarily be required to cause a given switch to change state, are indicated by the display.

The present invention involves a method and apparatus for determining the surface of a liquid in a tank such as a steam boiler by raising a plunger above the liquid surface and then letting it descend through the vapor until it touches the liquid surface, whereupon the descent rate abruptly decreases. The plunger is preferably a hollow float. In the preferred embodiment, the plunger is contained in a cylinder which is totally contained inside of the tank. This cylinder is of sufficient length to extend below and above the level of the liquid in the tank and is vented at both the top and the bottom. Thus, the cylinder is vented to the vapor and is vented to the liquid inside the tank. Means including magnetic coupling is provided for lifting the hollow plunger inside the cylinder, from the surface of the liquid and then releasing the plunger so that it descends inside the cylinder through the vapor to the surface of the liquid. Due to the great difference between the viscosity of the vapor and the viscosity of the liquid, the descent rate of the plunger through the vapor is much greater than the descent rate of the plunger once it reaches the liquid surface and so the sudden decrease in the descent rate can be noted to determine the location of the liquid surface just as though one were "touching" the surface to establish its location.

In a preferred embodiment of the present invention, the plunger is hollow and is vented only at the bottom. Thus, when the plunger is lifted in the cylinder, out of the liquid into the vapor, any condensate inside the hollow plunger will drain out of the bottom vent. Furthermore, vapor generated at the bottom of the tank that rises into the vent at the bottom of the cylinder will rise within the cylinder and if the hollow plunger is at the surface of the liquid in the cylinder, that vapor will enter the vent at the bottom of the plunger and become trapped inside the plunger. As the pressure of vapor inside the plunger increases, liquid inside the hollow plunger will be driven out of the vent at the bottom of the plunger. Thus, the amount of liquid contained inside the hollow plunger can be controlled by controlling the rate of flow of vapor, generated at the bottom of the tank, into the bottom of the cylinder.

In accordance with another feature of the present invention, means are provided for controlling the rate of flow of vapor from the bottom of the tank into the bottom of the cylinder. This includes a funnel which opens from the vent at the bottom of the cylinder. The collecting area of the funnel which is subtended on the bottom of the tank is variable and can be manipulated by an operator from outside of the tank. More particularly, the funnel is generally cone-shaped and includes two symmetrically located, radially extending slots which extend from near the neck to near the wide periphery of the funnel. Blocking plates fit into these slots and these plates are shaped and disposed so that as the plates move in and out of the slots they block the slots more or less and as the slots are blocked more or less, the capture area of the funnel is increased or decreased. Clearly, as the capture area of the funnel is increased or decreased under given conditions of temperature and heat flow to the liquid at the bottom of the tank through the funnel and into the cylinder will increase or decrease. As is described herein in greater detail, this can be used to control the levitation of the plunger with respect to the liquid level in the tank and depending upon that levitation and the position of the control, a determination can be made of the general rate of flow of heat to the liquid and from this, some indication can be had of the efficiency of the boiler.

As already mentioned, magnetic coupling is provided for lifting the plunger in the cylinder. In order to facilitate this, and to facilitate control of the funnel at the bottom of the cylinder (where such a funnel is included), a tube projects through the wall of the tank and into the cylinder concentric with the cylinder. This tube and the cylinder are oriented vertically and the tube is closed and sealed at the end inside the tank and is sealed to the tank where the tube projects through the tank wall. The cylinder may be attached to and carried by this tube or the cylinder may be supported elsewhere inside the tank. It is preferred that the tube extend through the bottom of the cylinder and the cylinder be attached at both the top and bottom thereof to the tube. The plunger encircles the tube inside the cylinder and is ring-shaped and moves freely along the common axis of the plunger, tube and cylinder with respect to the fixed tube and cylinder. Immediately adjacent the tube, the plunger carries one or more ring magnets oriented concentric with the common axis. Inside of the tube at the end of a rod which extends down the tube, are carried one or more plug magnets. Thus, as the rod is moved up and down external of the tank, the plunger is lifted up and down and vice versa, due to the magnetic forces between the ring and plug magnets. Thus, the rod moves directly up and down with the plunger. At the external end of this rod are located one or more magnets which move successively in proximation to a linear arrangement of magnetic reed switches. These switches control energization of an electrical display that reveals the position of the plunger with respect to the tank.

In accordance with another novel feature of an embodiment of the present invention, the magnetic reed switches are of special design and perform similar to a single pole, single throw switch. Furthermore, the switches are assembled in a unique way so that the assembly of the switches can be calibrated to provide a display which indicates discrete, minute changes in position of the rod (and corresponding changing in position of the plunger).

The foregoing objects and features of the present invention, as well as many others and other advantages gained by these features and combinations of the features are disclosed further herein by the specific embodiments of the invention shown in the drawings. These embodiments represent the best known uses of the various features of the invention.

DESCRIPTION OF THE DRAWINGS

FIGS. 5 and 6 are cross section front and side views of the portion of the same apparatus shown in FIG. 1 that is contained inside the boiler tank equipped with the structure including a variable funnel for controlling the flow of vapor from the bottom of the tank into the cylinder;

FIGS. 7 and 8 are cross section top views of the apparatus shown in FIGS. 5 and 6 taken as shown in those figures;

FIGS. 9 and 10 are side and top views of a single pole, double throw magnetic reed switch, specially adapted for use in the display apparatus of the present invention;

FIGS. 13 and 14 are cross section views of embodiments where the cylinder and plunger are located outside the boiler.

DESCRIPTION OF EMBODIMENTS OF THE INVENTION

Figure 1:
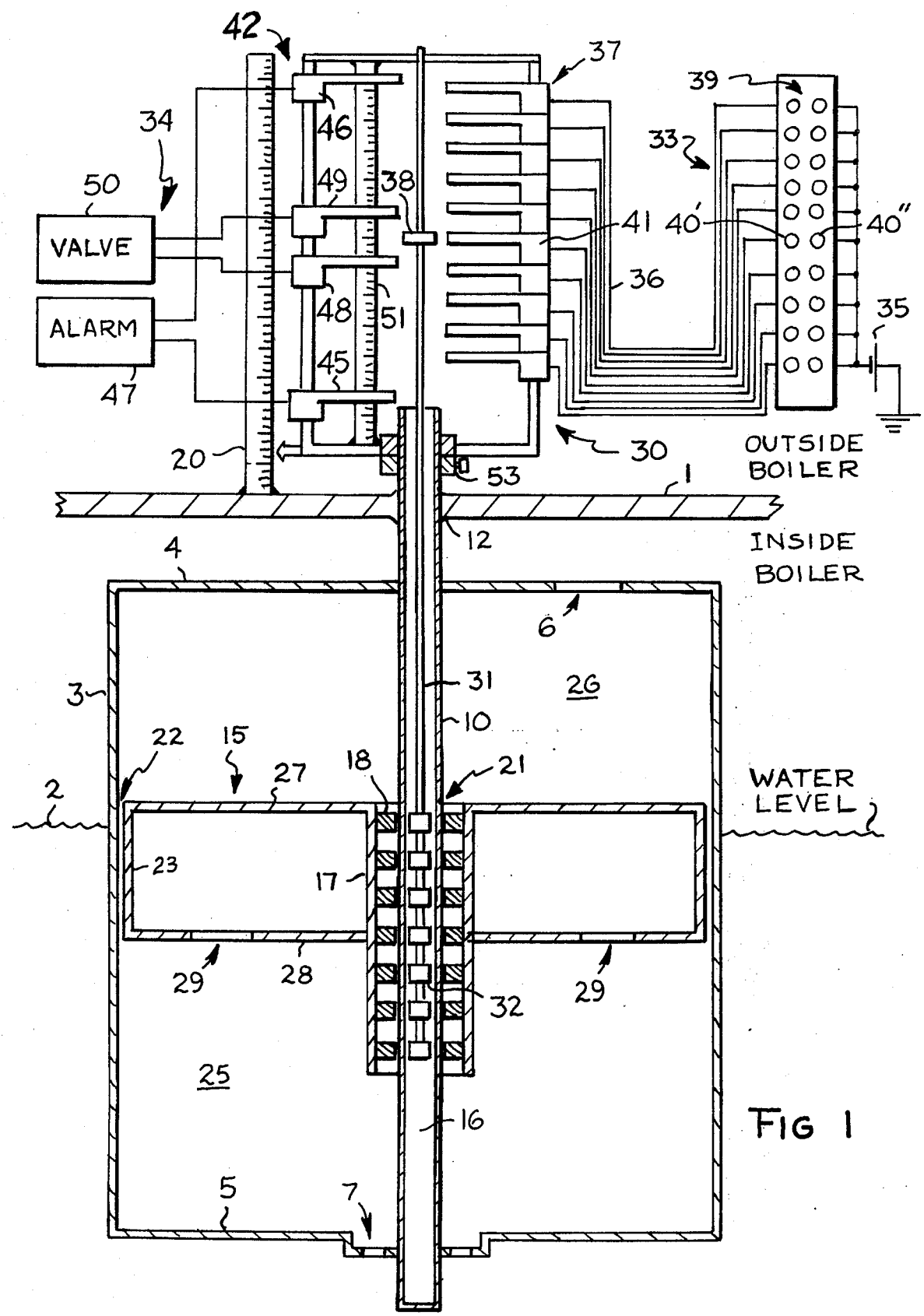
FIG. 1 is a mechanical schematic drawing in cross section showing an embodiment of the present invention for detecting and displaying the level of water in a boiler.

The mechanical arrangement illustrated in FIG. 1 shows apparatus inside and outside of a boiler tank. A wall (preferably a top wall) 1 of the boiler tank is shown in cross section. The inside and outside of the tank are so designated in this figure. Inside the tank, the level of water is indicated at 2 and so below that level there is liquid water and above it there is gas and vapor. Inside the tank, the cylinder 3 is located in a vertical position and is closed at the top by top wall 4 and closed at the bottom by bottom wall 5. Both the top and bottom walls are vented. For this purpose, the vapor vent passage 6 is provided in the top wall and the liquid vent passage 7 is provided in the bottom wall.

The cylinder attaches at both ends to the tube 10 that projects through the wall of the tank. This tube is closed at 11 which is the end thereof inside the tank and sealed to the wall at 12 by welding. Thus, the tube is carried at the tank wall and the cylinder is carried by the tube.

Within the cylinder between the inside walls of the cylinder and the outside walls of the tube is located the hollow plunger 15. This plunger is ring-shaped and is oriented concentric with the common axis 16 of the tube and cylinder. This inside wall 17 of the plunger carries attached on the outside thereof a plurality of ring-shaped magnets 18 which are concentric with the common axis. These magnets are preferably regularly spaced along the wall 17, and the portion of the wall which extends as a skirt 19 below the plunger so that it can carry a number of the ring magnets 18. These magnets fit freely around the tube 10 and the plunger fits freely inside the cylinder 3. Thus, a space 21 is provided between the inside periphery of the magnets 18 and the outside of the tube 10 which permits free movement of the plunger relative to the tube. Also, a space 22 is provided between the outside wall 23 of the plunger and the inside of the cylinder 3. These spaces 21 and 22 are preferably just enough to permit free movement of the plunger up and down the common axis so that it does not bind either on the tube 10 or inside the cylinder 3. At the same time, these spaces, 21 and 22, provide a ready passage for vapor rising up through the liquid in the cylinder from the liquid space 25 in the cylinder below the plunger to the vapor space 26 in the cylinder above the plunger.

The top wall 27 of the plunger is preferably completely sealed and closed and so it seals at the edges with the inner and outer walls 17 and 23, respectively. The bottom wall 28 of the plunger also attaches to the inner and outer walls 17 and 23, respectively, and contains one or more vents 29 for the entrance or exit of vapor and liquid.

Within the tube 10 is a rod 31 which carries, at the lower end thereof, several plug magnets 32. These magnets are preferably regularly spaced just as the ring magnets 18 and there may be the same number of plug magnets as ring magnets. In this figure, the plug and ring magnets are shown aligned, one for one. The poles of these magnets may be arranged so that at the position shown in FIG. 1 with the magnets aligned, the maximum magnetic attraction force is exerted between the rod 31 and the plunger 15. This force is more than sufficient so that when the rod 31 is lifted from outside the tank, the plunger is lifted with it. Also, the rod can be moved up and down to cause the plunger to move up and down as may be necessary from time to time to dislodge the plunger in case it hangs up on the tube 10 or binds inside of the cylinder 3.

Outside of the tank alongside fixed scale 20, the rod extends vertically through an assembly of switches and scales 30 carried by the tube 10. This assembly of switches controls energization of a fixed visual display 33 which may be located remote from the tank and certain valves and alarms 34 of the boiler system. The switches control energization of the display by a source of electrical power 35 and connect electrically to the display and source by the harness of wires 36.

The assembly of switches 30 includes a first set of magnetically actuated reed switches 37 which are regularly spaced parallel to the rod 31. The inside end of these switches magnetically couple with the activating magnet 38 fixedly attached to the rod. Each time the magnet passes the end of a switch, the electrical state of the switch changes. For example, as the magnet passes the end of a switch moving upward, that switch changes to one state and as the magnet passes the same switch moving downward that switch changes to another state. These switches control energization of corresponding lights 39 of the display 33. For example, there may be two lights disposed side by side for each switch such as lights 40' and 40'' controlled by switch 41. This switch controls the two lights so that as the magnet 38 passes the end of that switch moving downward, the light 40' on the left is energized and the light 40'' on the right is not energized. On the other hand, when the magnet 38 passes the end of that switch moving upward, the light on the right is energized and the light on the left is not energized. With this sort of display, a typical presentation following movement of the activating magnet 38 upward past the middle of the stack of switches 37 (past switch 41) would leave the lower part of the right hand column of lights and the upper part of the left hand column energized. This reveals that the level of the plunger is at a position which corresponds to the position of switch 41 which is approximately midway between the top and bottom of the display.

Another set of magnetically actuated reed switches, the specific functions set 42 provides switches at predetermined levels for controlling various valves, alarms or other indicators which are useful in the operation of the boiler. For example, four such switches are shown. The bottom and top of these 45 and 46 control an alarm such as alarm 47 and the middle two 48 and 49 control a valve such as valve 50. These switches function in pairs. For example, when the activating magnet 38 passes switch 45 moving downward or when it passes switch 46 upward, the alarm 47 could be energized and the switches can be wired to do this. Regarding the valve 50, it may be desired to turn that valve on any time the actuating magnet 38 passes switch 48 moving downward and it may be desired to turn it off any time that magnet passes switch 49 moving upward. These switches can be wired to control valve 50 for that effect. Parallel to the rod 31 is the moveable scale 51 mounted on the switch frame 52. This frame is adjusted on the tube 10 and held in place by locking collar 53. The position of activating magnet 38 in relation to the fixed scale 20 can be duplicated for scale 51 and switches 37 by making a corresponding relationship as the frame 52 is moved and then locked in place with locking collar 53.

Figure 2:
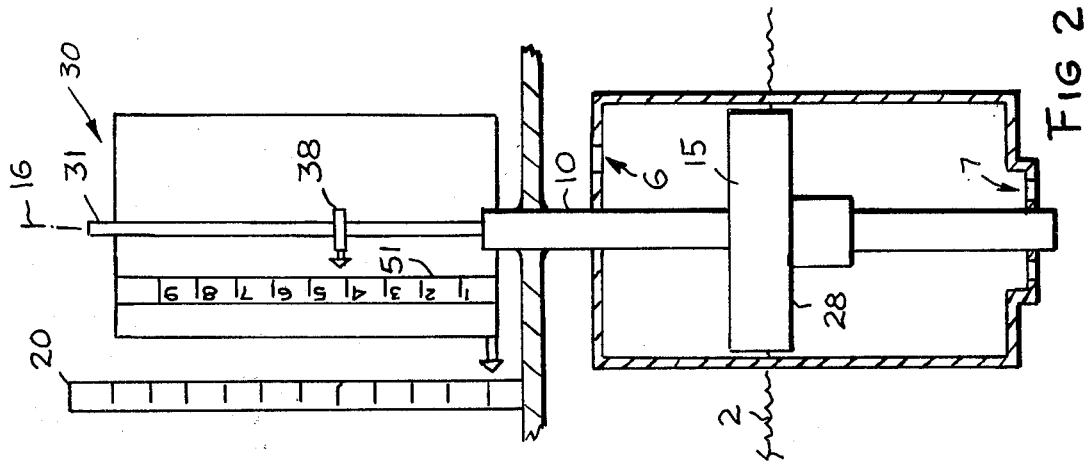
FIGS. 2, 3 and 4 are representative drawings in cross section of the same apparatus as shown in FIG. 1 to illustrate the operation and functioning of that apparatus.
Figure 3:
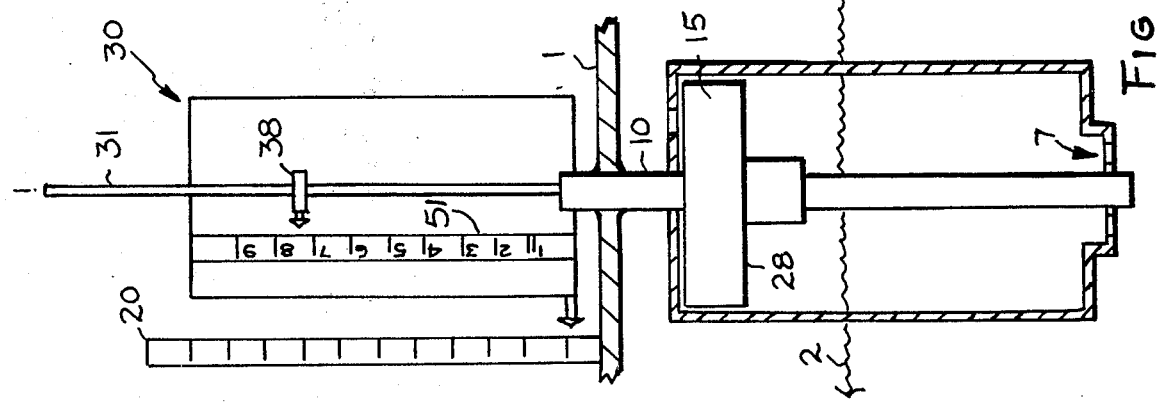
Figure 4:
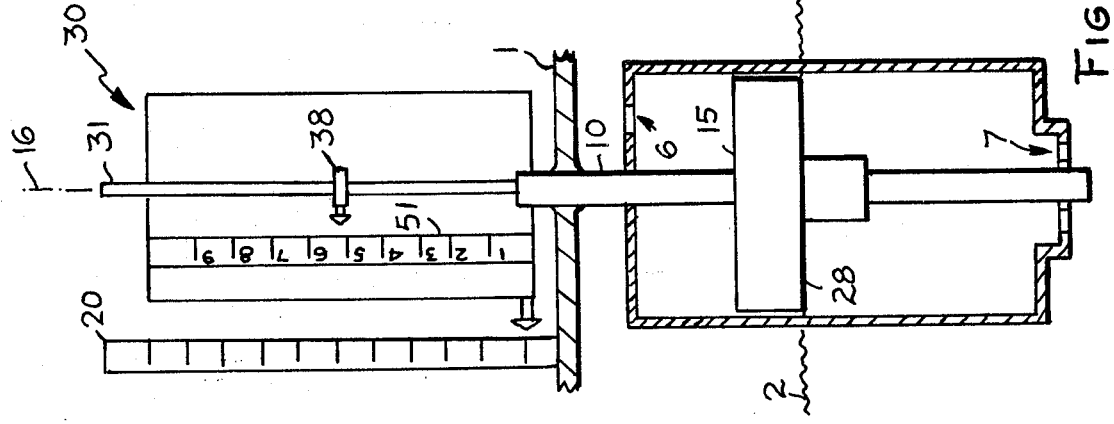

Operation of the system, shown in FIG. 1 to determine precisely the level of liquid in the tank is illustrated in FIGS. 2 to 4. FIG. 2 shows the position of the plunger as it rides on a bubble of entrapped gas. The gas is probably partially compressed permitting some entry of liquid into the bottom of the plunger. The plunger is partly submerged as influenced by the weight of the plunger and the amount of liquid displaced by the partly compressed gas trapped by the plunger. The gauge must be initially compensated to reflect the level of the liquid and if temperature or pressure have changed it must be re-compensated. The actual level is determined by raising the plunger above the liquid as in FIG. 3 and permitting it to return to surface as in FIG. 4.

FIG. 2 shows the initial position of the plunger 15 in the cylinder 3 when the plunger may contain some liquid and so, the bottom 28 of the plunger is below the liquid level 2 and the plunger is floating free within the cylinder. In this condition, the plunger is not fully levitated. Since the plunger is not fully levitated and there is no way to know how much liquid is inside the plunger, the position of the activating magnet 38 attached to rod 31 (that moves up and down with the plunger by virtue of the magnetic coupling between the two), is not precisely indicative of the position of the liquid surface 2.

In order to establish exactly where the liquid surface is, the rod 31 is manually lifted, lifting the plunger to substantially the top of the cylinder, as shown in FIG. 3. When this is done, the liquid inside the plunger drains out of the bottom vents 29 and so the plunger is then empty of liquid.

Next, the rod 31 is either released or moved steadily downward through the vapor space 26 at the top of the cylinder. For example, if the rod 31 is released, the plunger and rod will fall together at a relatively rapid velocity through the vapor space 26 at the top of the cylinder. The descent rate will be a function of the amount of clearance at 21 and 22 between the plunger and the tube and the plunger and the cylinder and the viscosity of the vapor. Since the clearances at 21 and 22 are constant for a given apparatus, the descent velocity will vary as the viscosity of the vapor. As soon as the bottom of the plunger touches the liquid level 2, the descent rate of the plunger will very abruptly reduce. In fact, the descent rate will all but stop. The operator will then note on the visual scale 20 the position of activating magnet 38 at which the descent rate abruptly reduces. That scale reading then represents the level of liquid 2 with reference to the tank.

The operator permits the plunger to ride again on a bubble of entrapped gas, but the difference between the rod position when the plunger was at the liquid surface and when the plunger is riding the gas bubble is noted and the frame 52 is adjusted to eliminate the variance for scale 51 and switches 37 and 42.

If the gas is sufficiently expansive the plunger would be fully levitated causing the plunger to ride right at the surface as shown in FIG. 4 making a compensation unnecessary.

FIGS. 5 to 8 show the construction of a variable funnel that can be attached to the bottom of the cylinder 3 to control the amount of vapor rising off the bottom of the boiler tank that enters the cylinder. Where this funnel is included attached to the bottom of the cylinder, the tube is made longer to accomodate parts for controlling the area of the funnel. Here, the tube is denoted 10' and the bottom of the cylinder is denoted 5', but all other parts of the plunger and cylinder bear the same reference numbers as in FIG. 1, because they may be identical. The funnel 61 is attached upside-down to the bottom 5' of the cylinder by the funnel neck 62 and the funnel and neck are concentric with the common axis 16. Thus, vapor rising from the bottom of the tank into the funnel, moves up the funnel neck into the cylinder.

The effective area of the funnel is varied and control means for this is provided which can be manipulated from outside the tank. It is convenient to do this through the inside of the tube 10' to which there is access from outside the tank. For example, two oppositely disposed radial slots 64 and 65 are provided in the funnel. These slots each extends from just inside the outer periphery 66 of the funnel, radially toward the neck and up a portion of the neck. By filling or blocking more or less of the area of these slots, the effective vapor capture area of the funnel is varied. For that purpose, the control mechanism 67 is provided. That mechanism consists of two plates 68 and 69 which ride up and down in the slot. These plates are carried by the control plate ring 71 that has attached at the inner periphery thereof a plurality of ring magnets such as ring magnet 72. These magnets magnetically couple with corresponding plug magnets 73 carried on the funnel adjusting rod 74 that is mounted to the closed end 75 of the tube 10'. The adjusting rod may be mounted by threadably engaging the funnel adjusting screw that is fixed to the bottom of the tube. A slot may be provided in the top of rod 74 so that the rod can be engaged by a long screwdriver that reaches down the length of tube 10' and is manipulated by an operator from outside the tank.

In operation of the funnel control 67, the rod 31 carrying the plug magnets 32 is first moved from the tube 10'. Then the screwdriver is inserted into the tube engaging the slot at the end of rod 74. The screwdriver is turned one way or the other to raise or lower the rod 74. Due to the magnetic coupling between the plug magnets 73 and the ring magnet 72, the plate ring 71 moves up and down with rod 74 and as it moves up and down the plates 68 and 69 also move up and down. When these plates move upward, the portion of slots 64 and 65 which is blocked by the plates is decreased and so the effective vapor capture area of the funnel is decreased. On the other hand, when the plates are moved downward, they fill a greater portion of the slots and so the effective capture area of the funnel is increased.

When the effective capture area of the funnel is increased, there is a greater flow of vapor up through the funnel neck into the cylinder 3, and so there is a greater flow of vapor into the plunger 15 through the bottom vent 29. As vapor flow into the plunger increases, the amount of liquid inside the plunger decreases and so, levitation of the plunger increases. Hence, control of the effective capture area of the funnel by turning the rod 74 one way or the other with a long screwdriver increases or decreases levitation of the plunger. Furthermore, a measure of this vapor flow into the plunger required to maintain full levitation is represented by the rotational position of the rod 74 and this can be determined by keeping track of the number and direction of turns of the rod by the long screwdriver. For example, after first determining the fluid level 2 by the steps described above with reference to FIGS. 2 and 4, the effective capture area of the funnel is then varied as necessary just to maintain full levitation of the plunger. This can be done over a relatively short interval of time by noting an apparent change in the liquid level, because the plunger accumulates liquid and then increasing the effective capture area of the funnel just sufficiently to restore full levitation of the plunger. When a sitation of full levitation is maintained for a few minutes, then it can be concluded that the effective capture area of the funnel is just sufficient to maintain full levitation. The effective capture area of the funnel required to maintain full levitation of the plunger is a measure of rate of flow of heat to the water in the boiler tank. By this method, this measure of rate of heat flow can be quickly made by an operator making a few simple readings and manipulations from outside the tank.

FIGS. 9 and 10 are side and top views of a single pole, double throw magnetically actuated reed switch suitable for use as one of the reed switches 37 or 42 which couples magnetically to the initiating magnet 38 carried on rod 31. This switch is enclosed in a housing 80. A glass envelope 81 encloses the two terminals 83 and 84, which are the stationary terminals of the switch and are extensions of the poles denoted N and S of magnet 85. The terminal 82 is a thin reed-shaped member 86 of magnetically permeable electrically conductive material. This member extends outside the glass envelope 81 substantially perpendicular to the common axis and turns ninety degrees, still perpendicular at 87 to axis 16. On that turn is mounted a cylinder 88 of highly permeable material. Electrical leads 91, 92 and 93 connect to the terminals 82, 83 and 84, respectively and these leads become part of the harness 36 in circuit with the display 33 and electric power source 35.

In operation, the activating magnet 38 moves along the common axis 16 as shown in FIG. 10. If the upper pole of the magnet 38 is a north and the lower pole is a south, then when magnet 38 passes cylinder 88 moving in the upward direction, the cylinder 88 and reed-like member 86 will be magnetized, first one way then the other and after the magnet 38 passes piece 88, a certain amount of remanance magnetization will remain in that piece. Since the south pole of magnet 38 is the last pole to pass piece 88, it will remain a north pole and the other end 86 of the reed-like member 86, between the two terminals 83 and 84, will remain a south pole and will be attracted to terminal 83 which is a north pole and so, terminals 82 and 83 short circuit. On the other hand, when the activating magnet 38 passes piece 88 moving downward, due to remanance magnetization, the piece 88 remains a south pole, the end 86' remains a morth pole and terminal 82 short circuits to terminal 84. Thus, the reed switch retains a memory of the direction the initiating magnet was going the last time it passed the switch.

Figure 11:
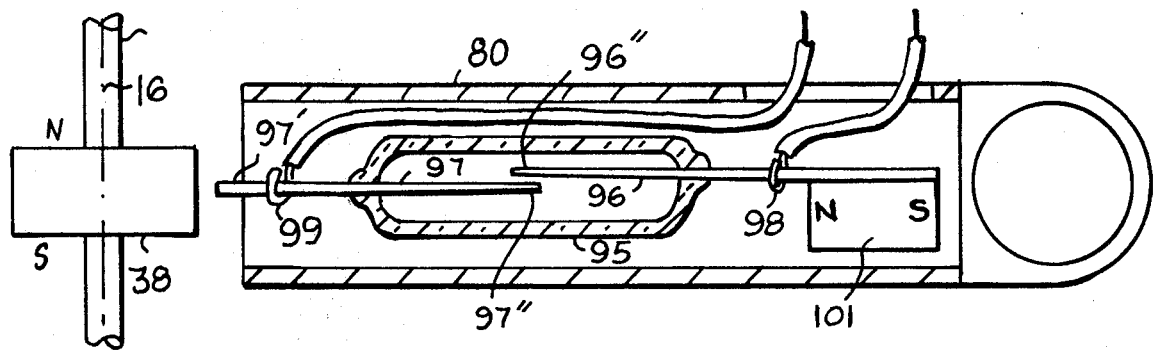
FIG. 11 is a side view of a single pole, single throw magnetically controlled reed switch particularly useful for generating the display in the present invention.

Another magnetically controlled reed switch that could be used for switches 37 or 42 to accomplish the functions of those switches is shown in FIG. 11. This switch may also be enclosed in a housing-like housing 80 which aids to mount the switches in physical series. This switch includes an envelope 95 enclosing two reed-like members 96 and 97 which are made of magnetically permeable electrically conductive material. Members 96 and 97 protrude from the envelope to electrical terminal 98 and 99, respectively. Member 96 also extends to and contacts a permanent magnet 101 oriented as shown in the figure with the poles N and S as shown. With this arrangement, member 96 is a north pole.

The other reed member 97 extends through the glass envelope to 97' and is alongside the initiating magnet 38 which moves along the common axis 16. In operation, when the initiating magnet having poles as shown, moves past end 97' going upward, the remanance magnetization condition of member 97 is such that the contact end 97'' of this member which is adjacent the contact end 96'' of member 96 is a south pole. Since 96'' (at the inside end of 96) is a north and 97'' is a south, these two ends are attracted and contact each other, short circuiting the terminals 98 and 99. On the other hand, if the initiating magnet moves past the end 97' going downward, 97'' is left a north pole and so, the contact ends 96'' and 97'' repel each other maintaining an open circuit between terminals 98 and 99. Clearly, this magnetically actuated reed switch also retains a memory of the direction of movement of the initiating magnet, the last time it passed the switch.

Figure 12:
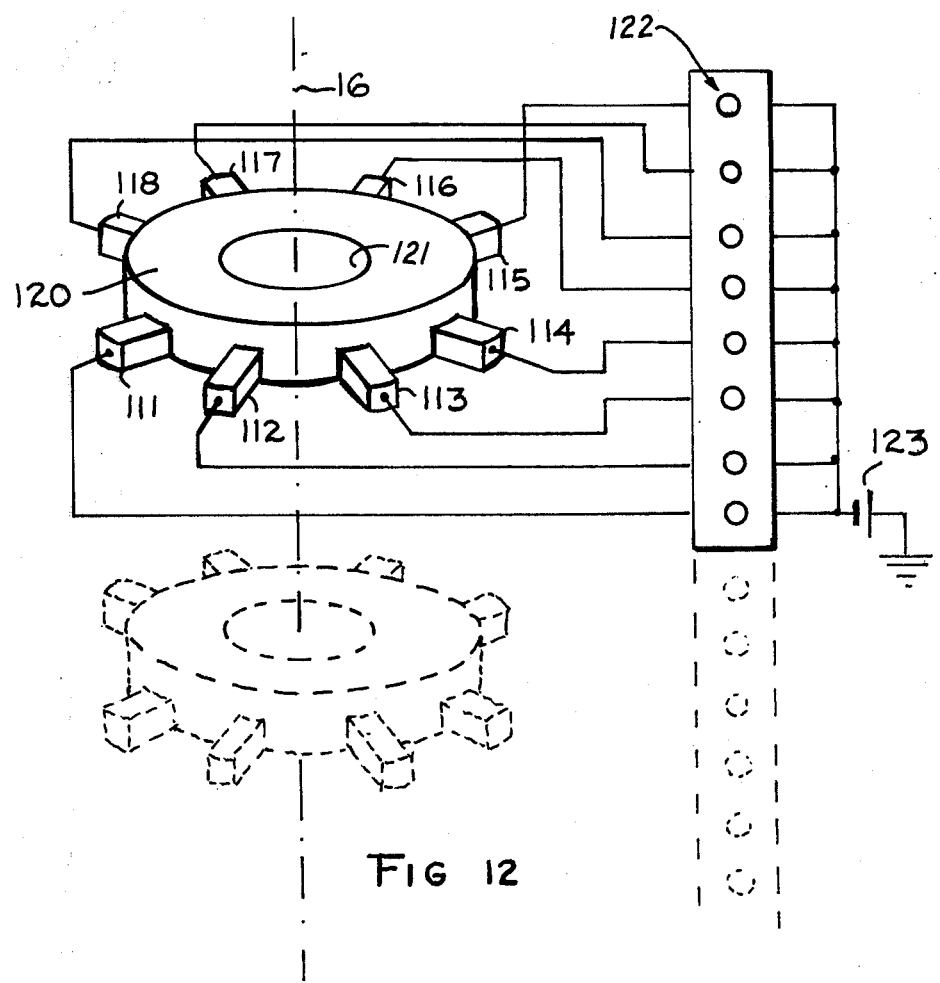
FIG. 12 illustrates a technique for assembling and calibrating a plurality of magnetically controlled reed switches to provide a fine presentation of the position of the plunger.

FIG. 12 illustrates a technique for using either of these magnetically actuated reed switches to provide means for detecting very small (fine) changes in position of the actuating magnet 38. As shown in FIG. 12, a plurality of the magnetically actuated switches 111 and 119 are oriented radially around axis 16, in substantially the same horizontal plane. These switches may be held in position, for example, by potting them in a suitable binding material 120. Clearly, the precise position of the part of each switch which magnetically couples to the passing actuating magnet, do not all lie precisely in the same horizontal plane. In other words, when the actuating magnet moving along the common axis 16 passes through the center 121 of the ring defined by this arrangement of switches, it is very unlikely that all of the switches will switch at the same instant. It is much more likely that they will switch in a random sequence that becomes fixed once they are encased in the potting material 120. The problem then is to determine that random sequence. This can be done simply by connecting the terminals of the switches in series with the bank of lights 122 and the electrical source 123 and then very carefully and slowly moving the actuating magnet along the common axis 16 and noting the sequence in which the lights are energized. Since each light represents a known one of the switches, the sequence of switching of the switches can be determined.

In any use of the arrangement of switches shown in FIG. 12, several such disc-chaped arrangements can be provided each adjacent an actuating magnet, like 38, along the common axis 16 for providing a very fine indication of changes in the position of the plunger along axis 16. Hence, two or more disc-like arrangements of the switches can be provided so that the coarse position indication, obtained with the electrical equipment shown in FIG. 1, can be supplemented by a fine indication of position using the equipment shown in FIG. 12.

The hollow plunger, also called a float, can be used without the cylinder to contain it. The plunger can be used inside the boiler tank, just as described herein with reference to FIG. 1, without the cylinder 3 enclosing the column in which the plunger rides. The structure for lifting the plunger and measuring the position of the plunger would be the same structure shown in FIG. 1 and so, the plunger would ride on closed tube 10. Also, the plunger would be levitated and so, it would ride on a bubble of gas or vapor at the liquid surface. This bubble includes the gas and vapor trapped inside the hollow plunger and a film of gas and vapor just below the plunger as it rests on the liquid surface. Hence, in the structure shown in FIG. 1, the cylinder serves principally as a turbulance baffle. In FIG. 1, the cylinder also restricts the flow of vapor and gas around the plunger as it descends and so dampens the descent rate of the plunger and it also tends to entrap the level of gas and vapor beneath the plunger which levitates the plunger. Thus, with the structure shown in FIG. 1, the cylinder could be omitted and satisfactory performance yet achieved. On the other hand, where the throttling mechanism, shown in FIGS. 5 to 8 is used, the cylindere must be used, because the throttle controls flow of gas and vapor into the cylinder.

A structure similar to the structure shown in FIG. 1, operated in substantially the same way, could be provided outside of the boiler tank in a column defined by a vertical tube outside of the boiler tank that connects at the bottom of the liquid and at the top of the non-liquid medium (gas and vapor). Embodiments illustrating this arrangement are shown in FIGS. 13 and 14. In these embodiments, a portion of the boiler tank is denoted 131 containing the liquid 132 and non-liquid medium 133. The liquid level is denoted 134. The external tube may be simply a piece of pipe 135 in which rides a plunger magnet 136 that fits slideably inside the tube. Alongside the tube on the outside is a lifting magnet 137 which is used to lift the plunger magnet by an operator manipulating the lifting magnet from the outside of the tube. The lifting magnet may be a ring magnet and encircle the tube on the outside. The orientation of poles of the lifting magnet and the plunger magnet may be as shown in FIGS. 13 and 14. More particularly, if the poles of the plunger magnet are north on top and south on bottom then the poles on the lifting magnet are south on top and north on bottom and vice versa. Thus, the attractive force between the magnets carries the plunger magnet along with the lifting magnet.

In FIG. 13, the external tube 135 opens at the top by connection 138 to the gas and vapor space in the tank. The bottom of the tube 135 connects by 139 to the bottom of the tank and so, provides a passage to the liquid 132 in the tank. This connector 139 includes orifice 141 which tends to dampen the flow of liquid between the tank and the external tube.

In FIG. 14, the top of the external tube 135 connects to the non-liquid medium in the tank through a gas valve 142 and the bottom of the tube connects to the liquid in the tank through liquid valve 143. These valves can be opened fully or shut completely.

The apparatus in either of FIG. 13 or 14 is used by an operator who simply lifts the lifting magnet 137 moving the plunger magnet up the tube 135. Then the lifting magnet is moved downward steadily until the bottom of the plunger meets the liquid surface 134' in the tube. At this point, the plunger abruptly stops and so an upward magnetic drag force is exerted on the lifting magnet 137 which the operator can feel. In this way the operator feels the liquid surface 134' in the external tube which is presumed to be the same as the surface 134 in the tank.

In FIG. 13, the orifice 141 serves a function during the test. It restricts the flow of liquid from the tube back into the tank. More particularly, it restricts that flow to a volumetric rate which is substantially less than the volumetric rate of displacement of the descending plunger magnet 136. In this way, the abruptness in change in descent rate of the plunger is increased compared to what would be achieved without the orifice.

In FIG. 14, when a test is made to feel the surface of the liquid, the gas and liquid valves 142 and 143 are closed which fixes the column of liquid and non-liquid in the external tube 135. Then, when the plunger magnet descends from the top of the tube, the descent rate is substantially totally determined by the viscosity of the medium in which it is descending so immediately that the bottom of the plunger meets the liquid surface 134', the descent rate very abruptly changes and can be felt very distinctly by the operator.

The several features of the present invention described herein combine to provide a unique apparatus for detecting and displaying the level of water in a boiler tank, or for that matter, the level of any liquid in any tank. By employing the methods and structures described herein, a rather precise determination and/or indication of the liquid level is achieved. Furthermore, using the hollow plunger and controlling the levitation of the plunger as described can reveal other performance parameters of a steam boiler, such has the rate of flow of heat to the water in the boiler. These embodiments of the invention represent the best known uses of the features of the invention. It is to be understood that certain structural changes, substitutions and modifications could be made by those skilled in the art without departing from the spirit and scope of the invention as set forth in the appended claims.

What is claimed is:
1. Apparatus for determining the level of liquid in a container which contains a liquid and a non-liquid medium at high pressure comprising,
   means for enclosing a portion of the liquid at the liquid level in a substantially vertical volumn partially open at both ends,
   the enclosed liquid being substantially entrapped in the lower portion of the column with a non-liquid medium extending upward from the liquid surface in the column,
   a plunger in the column providing a bottom plunger surface generally parallel to and juxtaposed to the liquid surface, the edge of said bottom plunger surface fitting slideably in the enclosing means so as to restrict substantially fluid flow in the column past the plunger,
   the plunger being adapted to descent in the column through the non-liquid medium toward the liquid medium,
   the plunger being at least partially open at the bottom so as to entrap vapor within the plunger, whereby the plunger descends until the weight of the plunger is balanced by the force of vapor rising from the liquid surface when the bottom plunger surface is at the liquid surface, and means coupled to the plunger for indicating the descent of the plunger in the column, whereby the point in the descent of the plunger at which an abrupt change of the plunger descent rate occurs is determinable to indicate the liquid level.

2. Apparatus as in claim 1 wherein,
the indicating means coupled to the plunger moves with the plunger and is coupled thereto magnetically.

3. Apparatus as in claim 2 wherein,
the plunger carries a magnet,
the indicating means coupled to the plunger carries another magnet and
the magnetic force between the magnets causes the indicating means to move with the plunger.

4. Apparatus as in claim 1 wherein,
means are provided for lifting the plunger in the column,
whereby the plunger can be lifted from the liquid level and released to descend in the column through the nonliquid medium to the liquid.

5. Apparatus as in claim 4 wherein,
the means for lifting the plunger couples to the plunger magnetically.

6. Apparatus as in claim 5 wherein,
the indicating means coupled to the plunger moves with the plunger and is coupled thereto magnetically.

7. Apparatus as in claim 6 wherein,
the means for lifting and the indicating means include in common,
a tube extending vertically into the container central of the column, the inside of the tube being sealed from the inside of the container,
a rod inside the tube,
one or more magnets attached to the plunger,
one or more magnets attached to the rod which couples magnetically with the plunger magnets, and
means for manipulating the rod in the tube,
whereby lifting the rod lifts the plunger and releasing the rod releases the plunger so that the plunger descends in the column, and
the indicating means is actuated by the rod.

8. Apparatus as in claim 7 wherein,
the means enclosing the liquid in a vertical column is formed by a cylinder in the container, the cylinder having openings at the top and bottom, the opening at the bottom of the cylinder serving to restrict fluid flow between the cylinder and the container,
the plunger is a ring-shaped body in the cylinder,
the tube is concentric with the cylinder and plunger,
the end of the tube inside the container is sealed, and
the rod is accessible from outside the container.

9. Apparatus as in claim 8 wherein,
the fit between the plunger and the cylinder and the fit between the plunger and the tube are such that flow of fluid in the column past the plunger as the plunger descends is restricted sufficiently to substantially impede the descent rate of the plunger in the column.

10. Apparatus as in claim 9 wherein,
the container is a steam boiler,
the liquid is water,
the non-liquid medium includes water vapor,
the tube extends into the boiler from the top thereof and
the liquid level is the level of water in the boiler.

11. Apparatus for determining the level of liquid in a container which contains a liquid and a non-liquid medium comprising,
means for enclosing a portion of the liquid at the liquid level in a substantially vertical column partially open at both ends,
the encosed liquid being contained in the lower portion of the column with the non-liquid medium extending upward from the liquid surface in the column,
a hollow plunger in the column fitting slideably in the enclosing means so as to restrict substantially fluid flow in the column past the plunger,
The bottom of the plunger being generally parallel to and juxtaposed to the liquid surface,
the plunger being at least partially open at the bottom so as to entrap vapor within the plunger,
whereby the plunger descends until the weight of the plunger is balanced by the force of vapor rising form the liquid surface when the bottom of the plunger is at the liquid surface, and
means coupled to the plunger for indicating the position of the plunger in the column.

12. Apparatus as in claim 11 wherein,
means are provided for lifting the plunger in the column,
whereby the plunger can be lifted from the liquid level to drain the plunger of liquid and then released to descend in the column through the non-liquid medium to the liquid.

13. Apparatus for determining the level of liquid in a container which contains a liquid and a non-liquid medium comprising,
means for enclosing a portion of the liquid at the liquid level in a substantially vertical column partially open at both ends,
the enclosed liquid being contained in the lower portion of the column with the non-liquid medium extending upward from the liquid surface in the column,
a hollow plunger in the column fitting slideably in the enclosing means,
the bottom of the plunger being generally parallel to and juxtaposed to the liquid surface,
the plunger being at least partially open at the bottom so as to entrap vapor within the plunger,
whereby the plunger descends until the weight of the plunger is balanced by the force of vapor rising from the liquid surface when the bottom of the plunger is at the liquid surface, and
indicating means magnetically coupled to the plunger so that said indicating means moves with the plunger for indicating the position of the plunger in the column.

14. Apparatus as in claim 13 wherein,
the plunger carries a magnet,
the indicating means coupled to the plunger carries another magnet and
the magnetic force between the magnets causes the indicating means to move with the plunger.

15. Apparatus for determining the level of liquid in a container which contains a liquid and a non-liquid medium comprising, means for enclosing a portion of the liquid at the liquid level in a substantially vertical column partially open at both ends, the enclosed liquid being contained in the lower portion of the column with the non-liquid medium extending upward from the liquid surface in the column, a hollow plunger in the column fitting slideably in the enclosing means, the bottom of the plunger being generally parallel to and juxtaposed to the liquid surface, the plunger being at least partially open at the bottom so as to entrap vapor within the plunger, whereby the plunger descends until the weight of the plunger is balanced by the force of vapor rising from the liquid surface when the bottom of the plunger is at the liquid surface, means coupled to the plunger for indicating the position of the plunger in the column and means for lifting the plunger in the column magnetically coupled to the plunger.

16. Apparatus as in claim 15 wherein, the indicating means coupled to the plunger moves with the plunger and is coupled thereto magnetically.

17. Apparatus as in claim 16 wherein, the means for lifting and the indicating means include in common, a tube extending vertically into the container substantially central of the column, the inside of the tube being sealed from the inside of the container, a rod inside the tube, one or more magnets on the plunger, one or more magnets on the rod which couple magnetically with the plunger magnets, and means for manipulating the rod tube, whereby lifting the rod lifts the plunger and releasing the rod releases the plunger so that the plunger descends in the column and the indicating means is actuated by the rod.

18. Apparatus as in claim 17 wherein, the means enclosing the liquid in a vertical column is formed by a cylinder in the container, the plunger is a ring-shaped body in the cylinder, the tube is concentric with the cylinder and plunger, the end of the tube inside the container is sealed and the rod is accessible from outside the container.

19. Apparatus as in claim 18 wherein, the container is a steam boiler, the liquid is water, the non-liquid medium includes water vapor, the tube extends into the boiler from the top thereof and the liquid level is the level of water in the boiler.

20. Apparatus as in claim 19 wherein, throttling means are provided inside the boiler at the bottom of the cylinder for controlling the rate of flow of vapor from the liquid into the bottom of the cylinder.

21. Apparatus as in claim 20 wherein, the sealed end of the tube extends into the throttling means and throttling control means are provided inside the tube which couple magnetically to the throttling means, whereby the throttling control means is adjustable from outside the boiler to vary the throttling means inside the boiler.

22. Apparatus as in claim 21 wherein, the throttling means includes a funnel-like channel oriented to intercept vapor rising in the liquid at the large end of the funnel and conduct the intercepted vapor into the bottom of the cylinder, and means for varying the effective intercepting area of the funnel, thereby varying the flow rate of the rising vapor into the bottom of the cylinder.

* * * * *